(12) United States Patent
Kobayashi

(10) Patent No.: US 7,708,882 B2
(45) Date of Patent: May 4, 2010

(54) WATER TREATING APPARATUS

(75) Inventor: Masato Kobayashi, Tokyo (JP)

(73) Assignee: Eco Creative Japan Co., Ltd., Kanagawa-Ken (JP)

( * ) Notice: Subject to any disclaimer, the term of this patent is extended or adjusted under 35 U.S.C. 154(b) by 405 days.

(21) Appl. No.: 11/750,477

(22) Filed: May 18, 2007

(65) Prior Publication Data

US 2008/0105605 A1　　May 8, 2008

(30) Foreign Application Priority Data

May 19, 2006　(JP)　............... 2006-140785

(51) Int. Cl.
*B01D 35/30* (2006.01)
*B01D 25/00* (2006.01)
*B01D 29/50* (2006.01)
*B01D 29/00* (2006.01)

(52) U.S. Cl. ............ 210/232; 210/209; 210/236; 210/252; 210/257.2; 210/267; 210/287; 210/328; 210/329; 210/321.69; 210/409; 210/420; 210/438

(58) Field of Classification Search ............ None
See application file for complete search history.

(56) References Cited

U.S. PATENT DOCUMENTS

| 6,740,235 | B2 * | 5/2004 | Gill | 210/238 |
| 6,977,040 | B2 * | 12/2005 | McCune et al. | 210/248 |
| 7,404,894 | B2 * | 7/2008 | Yamaguchi | 210/232 |
| 2002/0158001 | A1 * | 10/2002 | Northcut et al. | 210/323.2 |
| 2006/0144772 | A1 * | 7/2006 | Sato | 210/232 |
| 2007/0251876 | A1 * | 11/2007 | Krogue et al. | 210/323.2 |

FOREIGN PATENT DOCUMENTS

JP　　2005-224796　　8/2005

* cited by examiner

*Primary Examiner*—Krishnan S Menon
(74) *Attorney, Agent, or Firm*—Lucas & Mercanti, LLP

(57) ABSTRACT

A vertical membrane module unit is allowed to be installed even at a place with a low ceiling. A housing containing a vertical membrane module unit is held by a housing holder. The housing holder holds the housing tiltably such that the housing can be positioned with the longitudinal direction of the membrane module unit being substantially vertical when treated water is extracted, and the housing can be positioned with the longitudinal direction of the membrane module unit being substantially horizontal when the membrane module unit is removed from the housing.

8 Claims, 9 Drawing Sheets

WATER TREATING APPARATUS

BACKGROUND OF THE INVENTION

1. Field of the Invention

The present invention relates to a water treating apparatus for treating water using a hollow fiber membrane module.

2. Description of the Related Art

In water treating apparatuses for treating organic wastewater, sewage water or other wastewater, a method is used wherein a hollow fiber membrane module is contained in a housing, and filtration treatment is carried out using the hollow fiber membrane module. Various structures have been proposed for the hollow fiber membrane module. Among them, a so-called vertical hollow fiber membrane module, which is structured to be disposed in a housing such that the longitudinal direction of the hollow fiber membrane module is vertical, may sometimes be used.

When the above-described vertical hollow fiber membrane module is to be replaced or checked, the hollow fiber membrane module is typically pulled upward in the vertical direction to be removed from the housing. For minimizing the height to which the hollow fiber membrane module needs to be lifted, a structure has been proposed where the hollow fiber membrane module is contained in a housing that can be divided into multiple parts in the longitudinal direction (see, for example, Japanese Unexamined Patent Publication No. 2005-224796). In the structure disclosed in Japanese Unexamined Patent Publication No. 2005-224796, the hollow fiber membrane module is contained in a cartridge, and the cartridge is contained in the housing. The housing is formed by three or more members coupled to each other. In order to remove the hollow fiber membrane module from the housing, upper two members and a lower cylindrical member forming the housing are decoupled, and the cartridge and the hollow fiber membrane module are pulled out in the vertical direction together with the upper two members.

Although the structure disclosed in Japanese Unexamined Patent Publication No. 2005-224796 allows reducing the height to which the hollow fiber membrane module needs to be lifted, the cartridge have to be pulled upward from the housing for replacing the hollow fiber membrane module. This necessitates an enough space between the housing and the ceiling for accommodating the pulled out cartridge, and therefore the vertical hollow fiber membrane module may not be installed at a place with a low ceiling.

SUMMARY OF THE INVENTION

In view of the above-described circumstances, the present invention is directed to provide a water treating apparatus using a vertical membrane module unit that can be installed even at a place with a low ceiling.

The water treating apparatus of the invention includes: a housing for receiving water to be treated fed thereto; a membrane module unit for applying filtration treatment to the water to be treated in the housing and extracting treated water, the membrane module unit being contained in the housing such that the membrane module unit can be pulled out from the housing; and a housing holder for holding the housing tiltably between a position where the longitudinal direction of the membrane module unit is substantially vertical and a position where the longitudinal direction of the membrane module unit is substantially horizontal.

The membrane module unit may have any structure as long as it can be pulled out from the housing, and the membrane module unit may include, for example, a membrane module, a holder for holding the membrane module, and abutting members provided at the holder, the abutting members abutting on the inner wall surface of the housing and being movable on the inner wall surface.

The holder may include a center pipe extending along the longitudinal direction of the membrane module and positioned substantially at the center, the center pipe spraying high-pressure water on the membrane module; a membrane module holder supported by the center pipe, the membrane module holder holding the membrane module in a position around the center pipe; and abutting member holders supported by the center pipe, the abutting member holders holding the abutting members.

The abutting member holders may be disposed at one end and the other end of the center pipe in the longitudinal direction, and the abutting member holder at the one end and the abutting member holder at the other end may be coupled by a gas supply pipe extending in the longitudinal direction of the membrane module, the gas supply pipe blowing gas toward the membrane module.

According to the water treating apparatus of the invention, a housing for receiving water to be treated fed thereto; a membrane module unit for applying filtration treatment to the water to be treated in the housing and extracting treated water, the membrane module unit being contained in the housing such that the membrane module unit can be pulled out from the housing; and a housing holder for holding the housing tiltably between a position where the longitudinal direction of the membrane module unit is substantially vertical and a position where the longitudinal direction of the membrane module unit is substantially horizontal are provided. This allows the housing to be tilted to the horizontal position and the membrane module to be pulled out in the horizontal direction for removing the membrane module from the housing, thereby eliminating need of enough space above the housing for the membrane module pulled up from the housing. Therefore, the water treating apparatus using the vertical membrane module can be installed even at a place with a low ceiling. Further, in a case where the water treating apparatus is newly installed at a place with a low ceiling, the housing holder 3 can be disposed on the ground with the longitudinal direction of the housing 2 being horizontal, and then the longitudinal direction of the housing 2 can be set in the vertical direction. Thus, the water treating apparatus can be efficiently installed without necessitating conventional extensive installation work, such as making a hole in the ceiling and installing the water treating apparatus though the hole.

If the membrane module unit includes a membrane module, a holder for holding the membrane module, and abutting members provided at the holder, which abut on the inner wall surface of the housing and are movable on the inner wall surface, then the membrane module unit is pulled out from the housing with being supported by the abutting members when the membrane module is to be removed from the housing, and therefore the membrane module unit can be smoothly pulled out. Further, when the housing is tilted, movement of the membrane module within the housing is limited by the abutting members, thereby preventing the membrane module from being damaged by contacting the inner wall surface of the housing.

Further, if the holder includes: a center pipe, which sprays high-pressure water on the membrane module, extending along the longitudinal direction of the membrane module and positioned substantially at the center; a membrane module holder, which holds the membrane module in a position around the center pipe, supported by the center pipe; and abutting member holders, which hold the abutting members, supported by the center pipe, then the holding strength with respect to the longitudinal direction of the center pipe holding the membrane module can be reinforced, as well as the surface of the membrane module can be washed with high-pressure water that is sprayed from the center pipe.

Moreover, if the abutting member holders are disposed at one end and the other end of the center pipe in the longitudinal direction, and the abutting member holder at the one end and the abutting member holder at the other end are coupled by a gas supply pipe, which blows gas toward the membrane module, extending in the longitudinal direction of the membrane module, then strength of the membrane module with respect to the longitudinal direction can be reinforced by the gas supply pipe, as well as the surface of the membrane module can be cleaned with gas.

DESCRIPTION OF THE PREFERRED EMBODIMENTS

Figure 1:
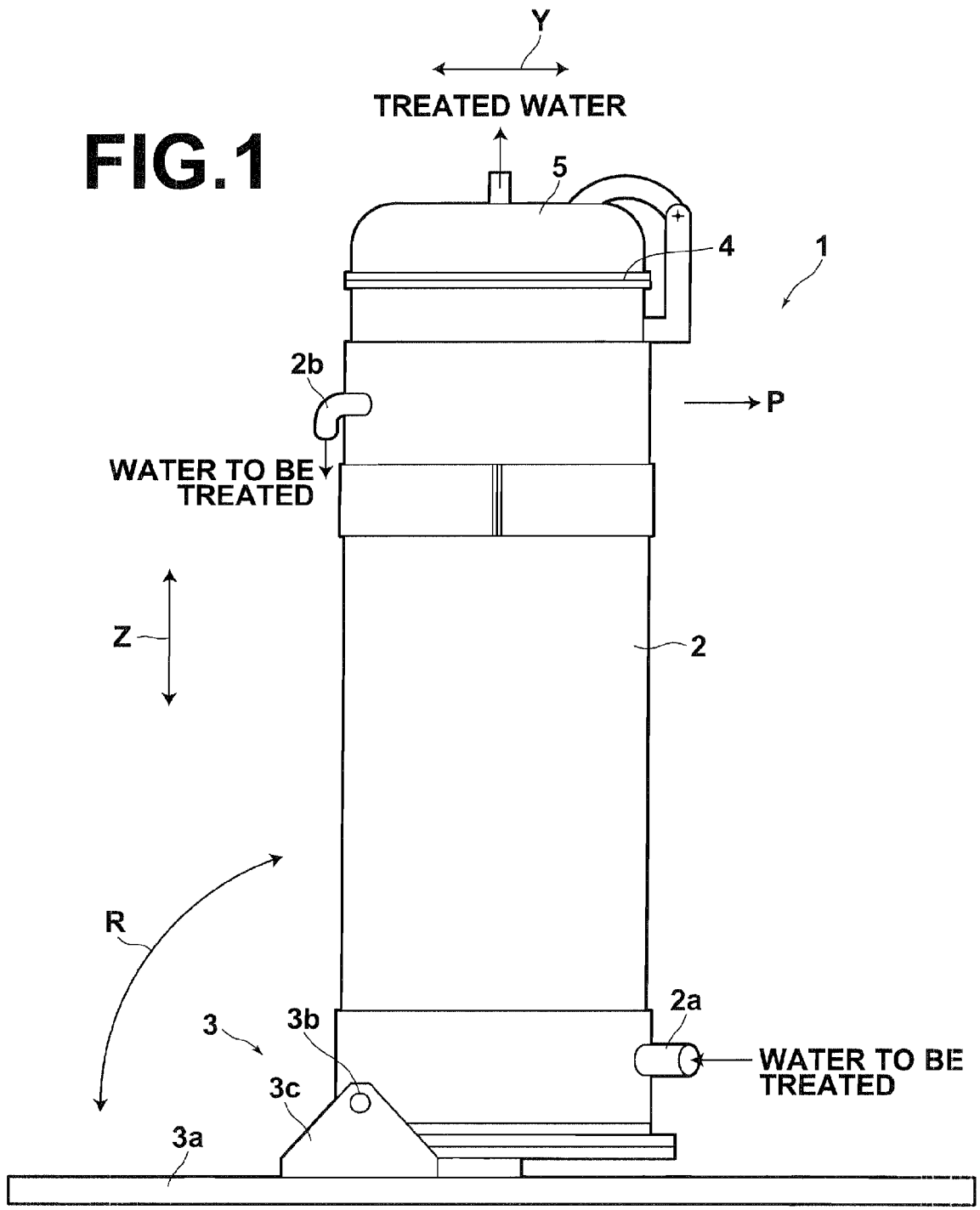
FIG. 1 is a view showing the appearance of a water treating apparatus according to a preferred embodiment of the present invention.
Figure 2:
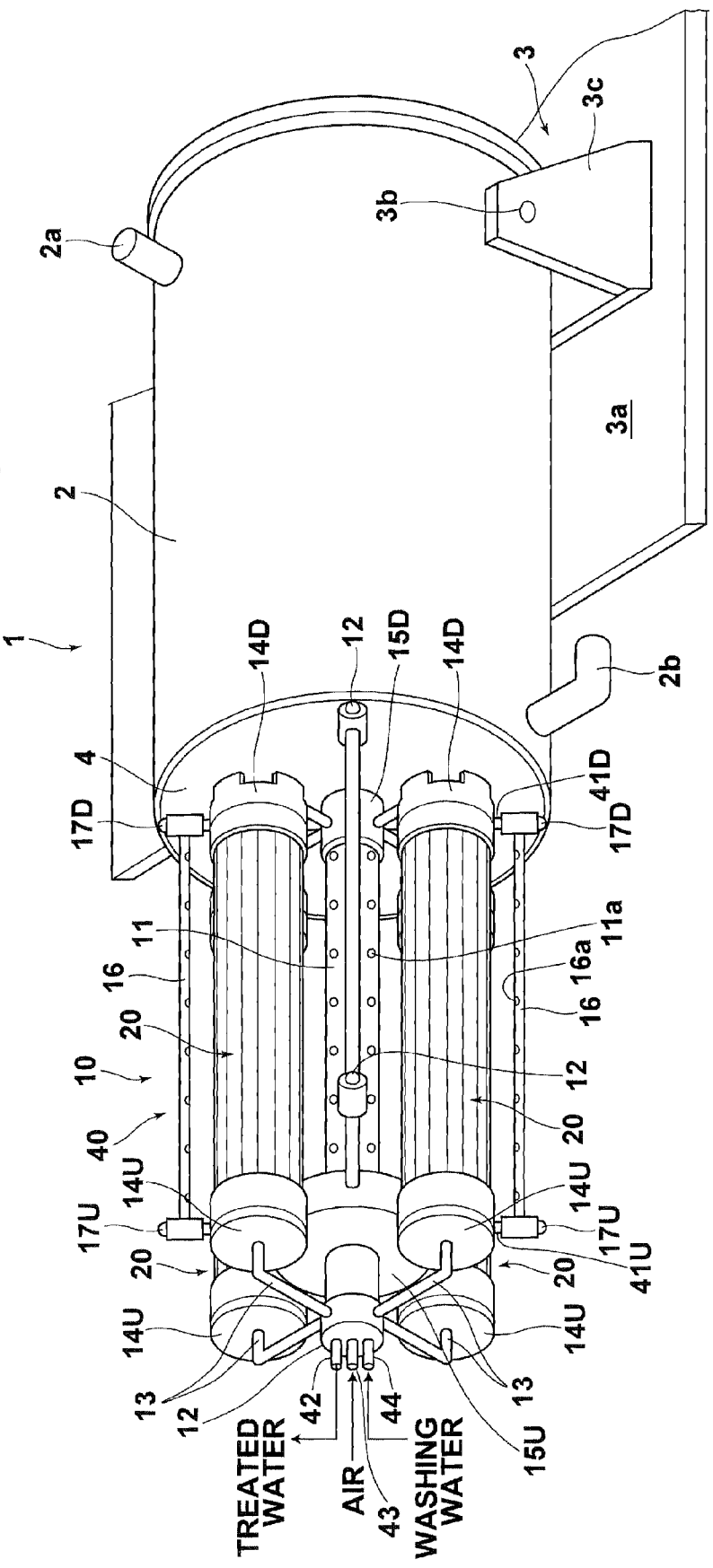
FIG. 2 is a perspective view showing the water treating apparatus of FIG. 1 with a membrane module unit being pulled out from a housing.
Figure 3:
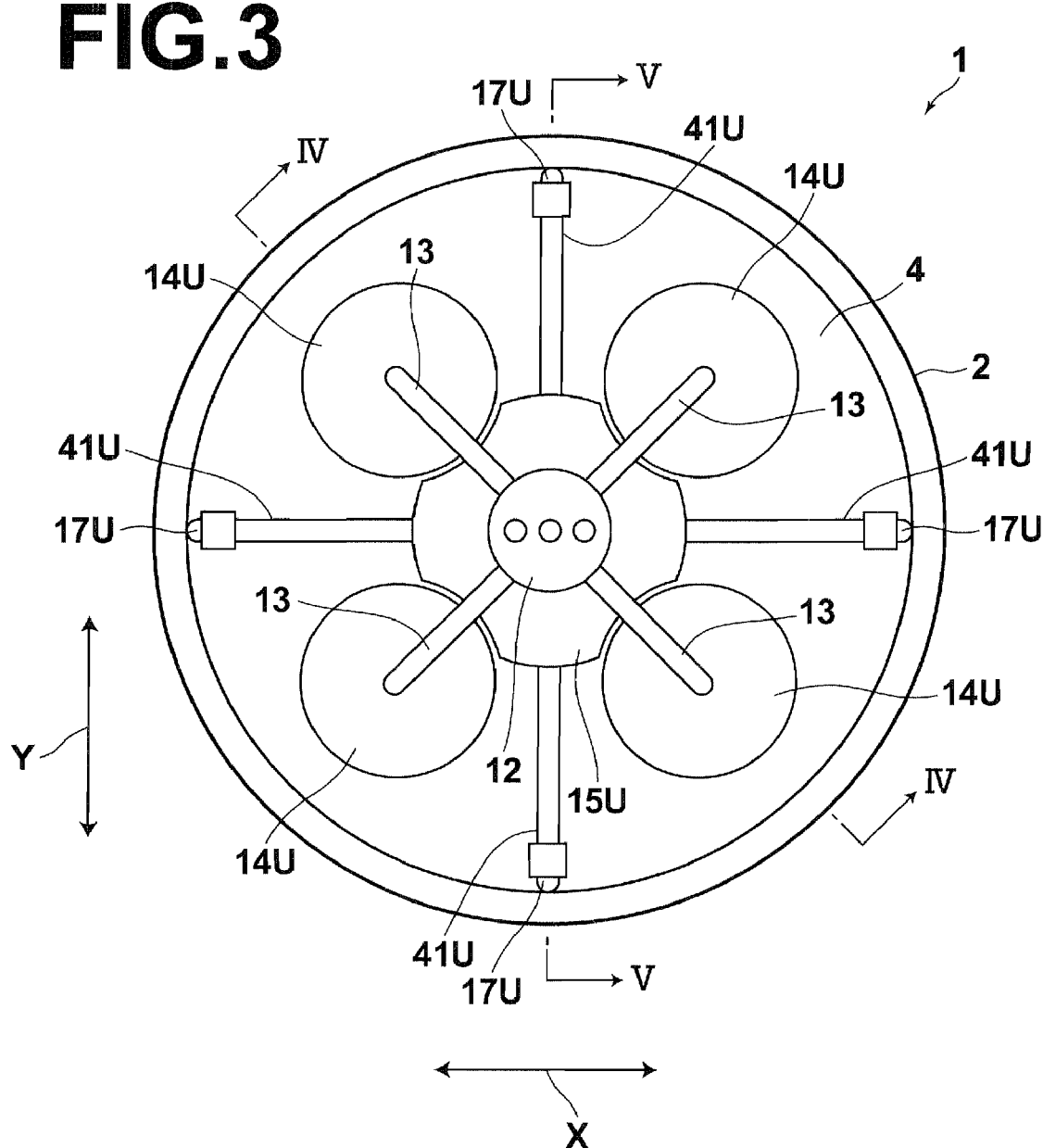
FIG. 3 is a schematic diagram showing the inside of the housing viewed from an opening of the housing of FIG. 1.

Hereinafter, a preferred embodiment of a water treating apparatus of the present invention will be described in detail with reference to the drawings. FIG. 1 shows the appearance of the water treating apparatus of the preferred embodiment of the invention, FIG. 2 is a perspective view showing a membrane module unit 13 pulled out from a housing 2, and FIG. 3 is a schematic diagram showing the membrane module unit 10 viewed from the side of an opening 4 of the housing 2. Now, the water treating apparatus 1 will be described with reference to FIGS. 1 to 3.

The water treating apparatus 1 applies filtration treatment to water to be treated, such as organic wastewater, using the vertical membrane module and extracts treated water. The water treating apparatus 1 includes: a housing 2 containing the membrane module unit 10 and having the opening 4 at the top, through which the membrane module unit 10 is pulled out; and a housing holder 3 connected to the lower portion of the housing 2 for tiltably holding the housing 2.

The housing 2 has a cylindrical shape extending in the vertical direction (the direction of arrow Z), and the membrane module unit 10 is contained therein. A feeding port 2a for feeding the water to be treated into the housing 2 is provided at the lower portion of the housing 2, so that the membrane module unit 10 filtrates the water to be treated fed through the feeding port 2a into the housing 2 and discharges the treated water. A discharging port 2b for cross-flow is provided at the upper portion of the housing 2, so that the treated water returns through the discharging port 2b to a treated water tank (not shown). A lid 5 for opening or closing the opening 4 is provided at the top of the housing 2, so that the membrane module unit 10 can be put in or pulled out through the opening 4, as shown in FIG. 2. During the filtration treatment, the opening 4 is closed by the lid 5 to seal the housing 2 as shown in FIG. 1.

The housing 2 is held by the housing holder 3. The housing holder 3 includes a base 3a, a shaft 3b fixed to the outer wall of the housing, and a bearing 3c fixed to the base 3a for rotatably holding the shaft 3b. This allows the housing 2 to be tilted around the shaft 3b in the direction of arrow R between a position where the longitudinal direction of the housing is substantially vertical (the position shown in FIG. 1) and a position where the longitudinal direction of the housing is substantially horizontal (the position shown in FIG. 2). During the filtration treatment, the housing 2 is held by the housing holder 3 such that the longitudinal direction of the housing 2 (the longitudinal direction of membrane modules 20) is substantially vertical, as shown in FIG. 1. On the other hand, when the membrane module unit 10 is to be pulled out, as shown in FIG. 2, the housing 2 is held by the housing holder 3 such that the longitudinal direction of the housing 2 (the longitudinal direction of the membrane modules 20) is substantially horizontal. It should be noted that the housing 2 can be easily tilted if a wire or the like (not shown) is connected to the upper portion of the housing 2 so that a tension in the direction of arrow P in FIG. 1 is always applied to the housing via the wire or the like.

Figure 4:
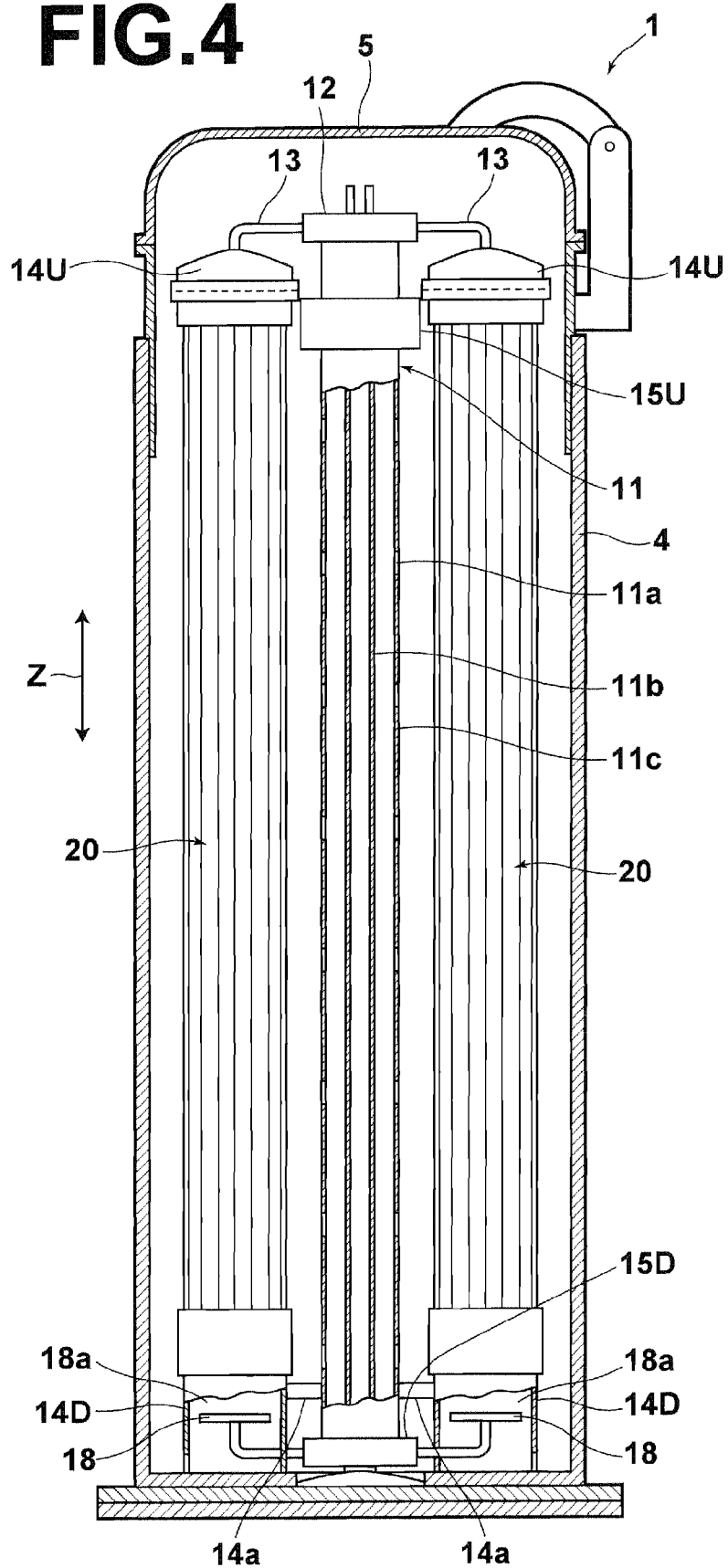
FIG. 4 is a sectional view showing one example of the cross section taken along line IV-IV in FIG. 3.
Figure 5:
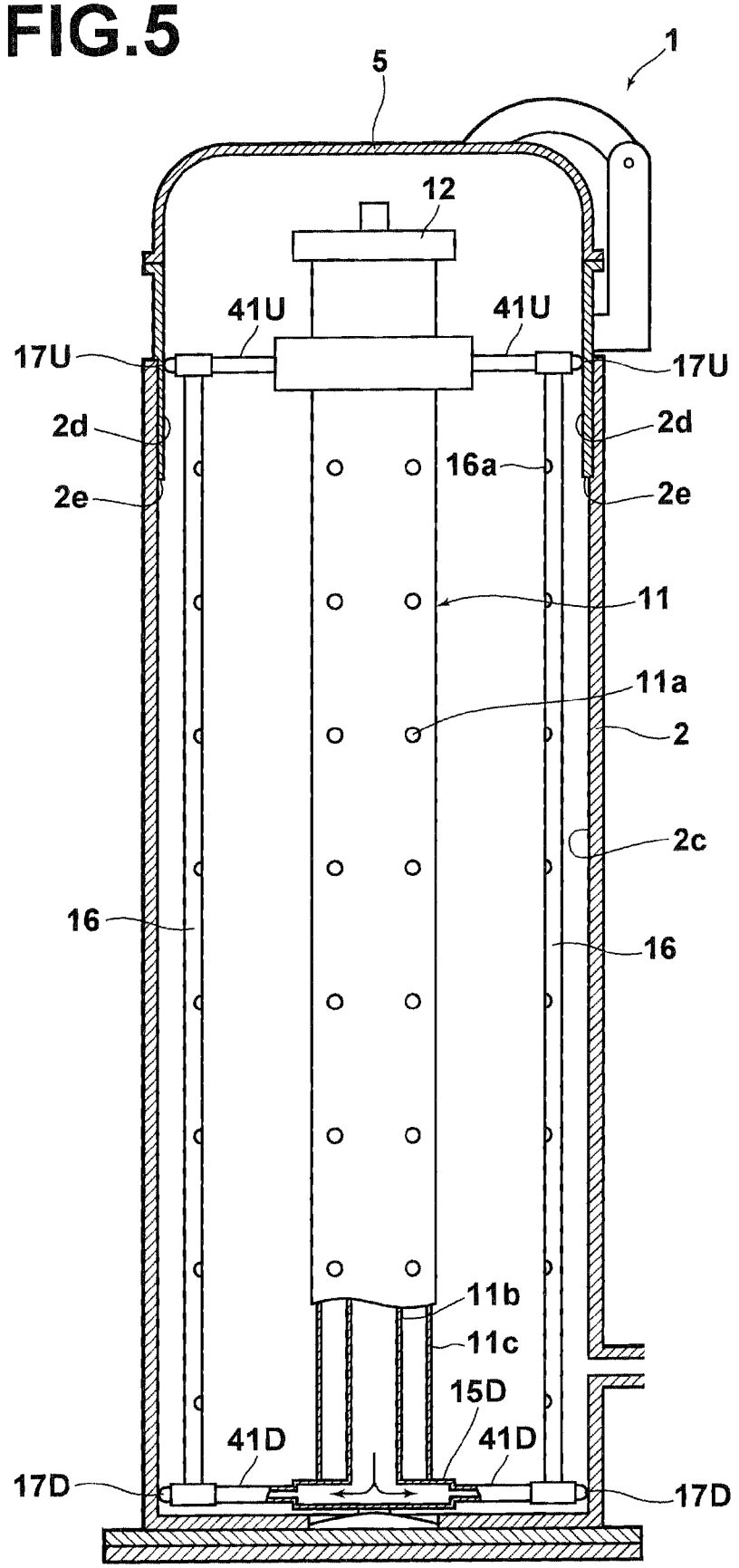
FIG. 5 is a sectional view showing one example of the cross section taken along line V-V in FIG. 3.

FIG. 4 is a sectional view taken along line IV-IV in FIG. 3, and FIG. 5 is a sectional view taken along line V-V in FIG. 3. Now, the membrane module unit 10 will be explained with reference to FIGS. 2 to 5. It should be noted that illustration of the membrane modules 20 is omitted in FIG. 5. The membrane module unit 10 filtrates the water to be treated fed into the housing 2 to extract the treated water. The membrane module unit 10 includes multiple membrane modules 20, a holder 40 for holding the membrane modules 20, and abutting members 17 provided at the holder 40, which abut on the inner wall surface of the housing 2 and are movable on the inner wall surface. The holder 40 further includes: a center pipe 11 extending in the longitudinal direction of the membrane modules 20 and positioned substantially at the center, for spraying high-pressure water on the membrane modules 20; membrane module holders 14U, 14D supported by the center pipe 11 for holding the membrane modules 20 in positions around the center pipe 11; and abutting member holders 41U, 41D supported by the center pipe 11 for holding the abutting members 17U, 17D.

The membrane module unit 10 includes, for example, four membrane modules 20 disposed symmetrically with respect to the center of the housing 2. Each membrane module 20 is formed by many hollow fiber membranes having, for example, an outer diameter of about 0.3 mm to 3 mm and a length of about 2 m, which are tied together at the opposite ends thereof with a resin or the like. Each membrane module 20 is removably held by the membrane module holders 14U, 14D. Specifically, the upper end of each membrane module 20 is removably fixed to the upper holder 14U with a band coupling or the like and the lower end of each membrane module 20 is removably fixed to the lower holder 14D by, for example, being fitted therein.

Each upper holders 14U is connected via a treated water pipe 13 to a joint 12 that is fixed to the center pipe 11, so that the treated water subjected to filtration treatment by the membrane module 20 is extracted via the treated water pipe 13 and the joint 12. Within each lower holder 14D, a gas diffusing means 18 for supplying gas (air) toward the membrane module 20 from below is disposed. It should be noted that, in each lower holder 14D, an air accumulating portion 18a is formed between the gas diffusing means 18 and the membrane module 20, so that gas is uniformly blown from the gas diffusing means 18 toward the membrane module 20. The upper holders 14U are supported by the center pipe 11 via the treated water pipes 13, and the lower holders 14D are supported by the center pipe 11 via coupling rods 14a. It should be noted that illustration of the coupling rods 14a is omitted in FIG. 2.

Each membrane module 20 is positioned substantially parallel to the longitudinal direction of the housing 2 by the upper holder 14U and the lower holder 14D. As described above, during the filtration treatment, the housing 2 is held by the housing holder 3 such that the longitudinal direction of the housing 2 is substantially vertical, and therefore each membrane module 20 is positioned with the longitudinal direction thereof being substantially vertical during the filtration treatment. This allows maximizing filtration performance of the so-called vertical membrane modules 20.

The center pipe 11 is positioned substantially at the center of the housing 2 so as to be surrounded by the membrane modules 20. The center pipe 11 is formed by a double pipe having many through holes 11a in the surface thereof. For example, an inner pipe 11b of the center pipe 11 is connected to a gas supply pipe 43, and an outer pipe 11c of the center pipe 11 is connected to a high-pressure water supply pipe 44. To wash the membrane modules 20, high-pressure water is supplied to the center pipe 11 and is sprayed on the membrane modules 20 via the through holes 11a. That is, the center pipe 11 serves as a high-pressure water supply pipe. It should be noted that the center pipe 11 may not only spray high-pressure water but also blow gas.

An upper joint 15U and a lower joint 15D are fixed to the top and the bottom of the center pipe 11. Four abutting member holders 41U, 41D, which radially extend from the center pipe 11, are fixed to the upper joint 15U and the lower joint 15D, respectively. The upper abutting member holders 41U at the top of the center pipe 11 and the lower abutting member holders 41D at the bottom of the center pipe 11 are coupled via gas supply pipes 16 extending along the longitudinal direction of the membrane modules 20. Each gas supply pipe 16 has many through holes 16a along the longitudinal direction for blowing gas to the side of the membrane module 20. The lower abutting member holders 14D are formed by pipes, and the gas to be fed from the gas supply pipes 16 is sent to each gas supply pipe 16 from the center pipe 11 via the lower joint 15D and the lower abutting member holder 14D. Providing the gas supply pipes 16, strength of the entire holder 40 with respect to the longitudinal direction can be reinforced and surfaces of the membrane modules 20 can be cleaned with gas.

Abutting members 17U, 17D for abutting on an inner wall surface 2c of the housing 2 to support the membrane module unit 10 are attached to the abutting member holders 41U, 41D at the ends thereof near the housing 2 so as to be movable on the inner wall surface 2c with abutting on the inner wall surface 2c. The abutting members 17U, 17D are formed, for example, by rollers, so that, when the membrane modules 20 are to be removed from the housing 2, the membrane module unit 10 can be smoothly pulled out even when fouling is formed on the inner wall surface 2c of the housing 2. Further, as shown in FIG. 3, when viewed from the center of the housing 2 in the radial direction, the abutting members 17 are positioned outward from the outermost portions of the membrane modules 20 to form a space between the membrane modules 20 and the housing 2. This prevents the membrane module unit 10 from being damaged by contacting the housing 2 when the membrane module unit 10 is moved or the housing 2 is tilted.

Figure 6:
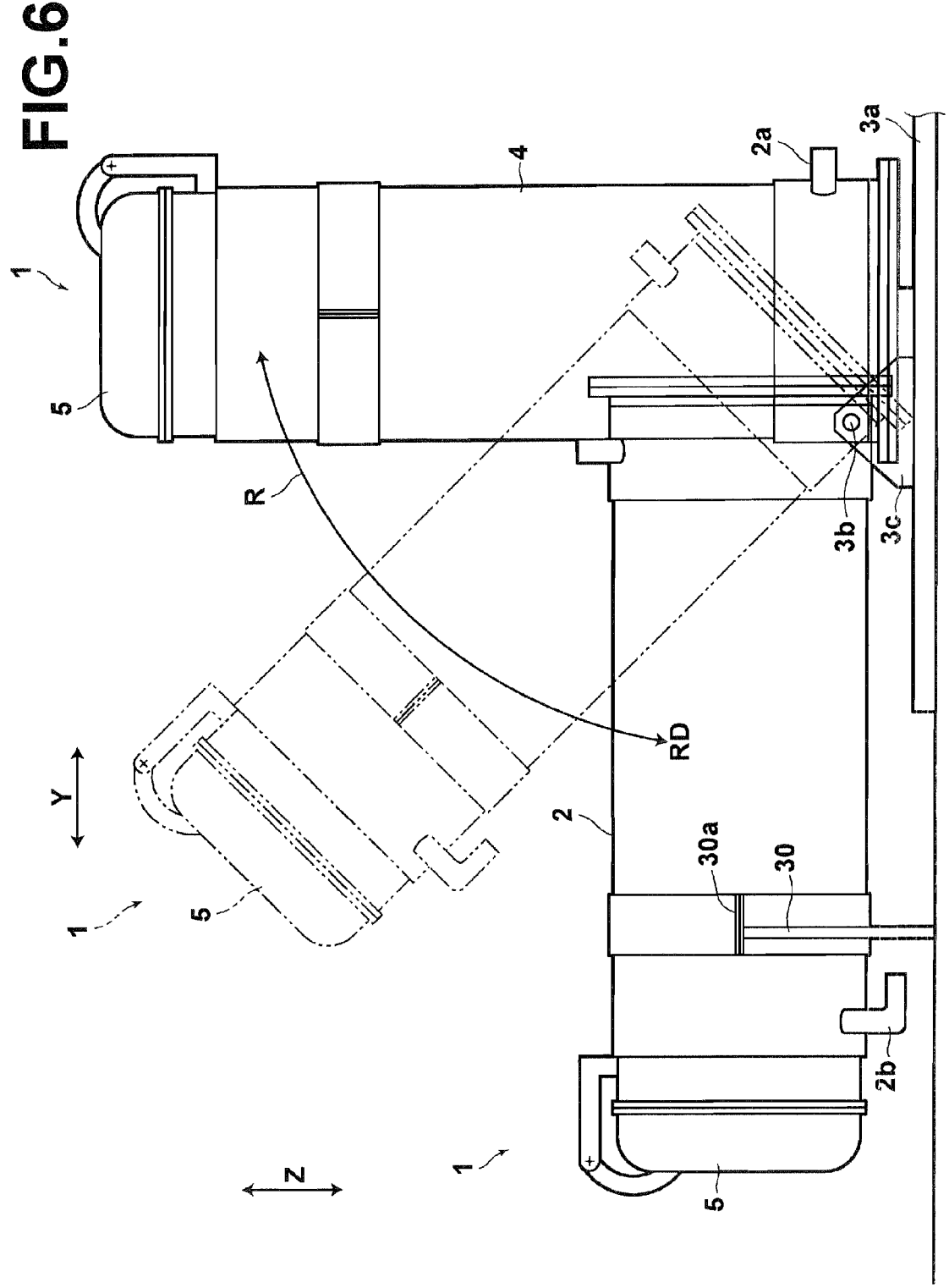
FIG. 6 is a schematic diagram showing how the water treating apparatus of FIG. 1 is tilted.
Figure 7:
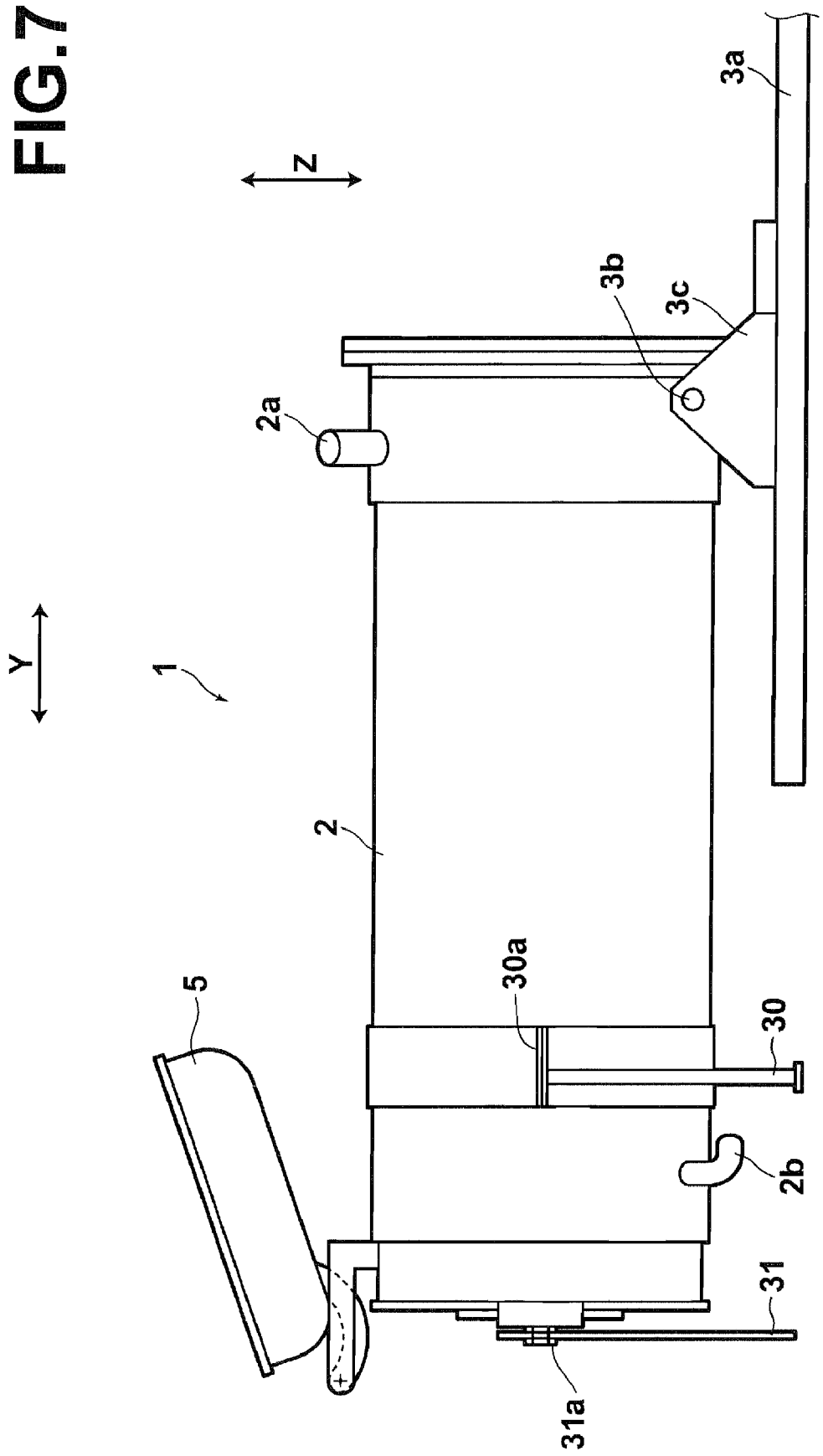
FIG. 7 is a schematic diagram showing how the membrane module unit is pulled out from the housing.
Figure 8:
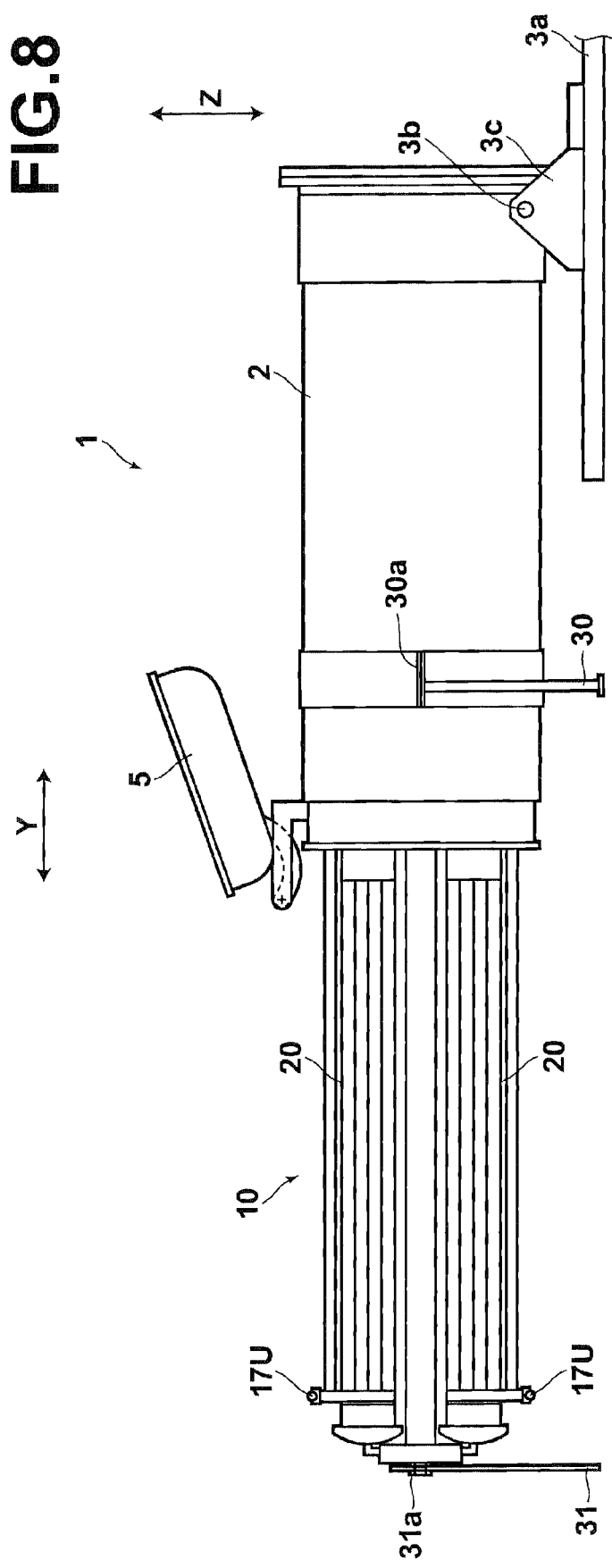
FIG. 8 is a schematic diagram showing how the membrane module unit is pulled out from the housing.

FIGS. 6 to 8 are schematic diagrams showing one example of a procedure for replacing the membrane modules 20 in the housing 2. Now, one example of the replacing operation of the membrane modules 20 will be described with reference to FIGS. 1 to 8. First, as shown in FIG. 6, the housing 2 is tilted around the shaft 3b from a state where the longitudinal direction of the housing 2 is substantially vertical (the direction of arrow Z). Then, the longitudinal direction of the housing 2 is set from the substantially vertical direction (vertical position) to the substantially horizontal direction (horizontal position). Thereafter, as shown in FIG. 7, the lid 5 is opened and the membrane module unit 10 contained in the housing 2 is ready to be pulled out. It should be noted that, when the housing 2 is in the horizontal position, load is applied to the portion of the housing near the opening 4. Therefore, in order to support the upper portion of the housing 2 by supporting members 30, 31 such as supporting pipes, supporting member receiving portions 30a, 31a may be provided at the upper portion of the housing 2 and at the top of the membrane module unit 10.

Subsequently, as shown in FIG. 8, the membrane module unit 10 is pulled out from the housing 2 in the horizontal direction (the direction of arrow Y). At this time, the abutting members 17U, 17D contact the inner wall surface 2c of the housing 2 and rotate while the membrane module unit 10 is moved. Thus, the membrane module unit 10 can be smoothly pulled out from the housing 2. Thereafter, the membrane modules 20 of the pulled out membrane module unit 10 are replaced or checked. It should be noted that the abutting members 17U, 17D may not necessarily be rotatable like rollers, but may make point contact and slide on the inner wall surface 2c of the housing 2 like fixed bails, for example.

As shown in FIG. 5, a projection 2d projecting inward is formed at the upper portion of the inner wall surface of the housing 2. The upper abutting members 17U attached to the upper abutting member holders 41U abut on the projection 2d, and the lower abutting members 17D attached to the lower abutting member holders 41D abut on the inner wall surface 2c of the housing, which is a step lower than the projection 2d. With this structure, when the membrane module unit 10 is pulled out, the lower abutting members 17D abut on an end portion 2e of the projection 2d, and thus the end portion 2e serves as a stopper for preventing the membrane module unit 10 from coming off from the housing. It should be noted that, for convenience of explanation, FIG. 2 shows the membrane module unit 10 completely pulled out from the housing.

According to the above-described embodiment, the housing holder 3 holds the housing 2 such that the longitudinal direction of the membrane modules 20 is vertical during filtration treatment, and when the membrane modules 20 are to be replaced, the housing 2 is tilted to the state where the longitudinal direction thereof is horizontal. Therefore, it is not necessary to pull the membrane module unit 10 upward in the vertical direction (the direction of arrow Z) to replace the membrane modules 20, and therefore the water treating apparatus using the vertical membrane modules 20 can be installed even at a place with a low ceiling.

That is, conventionally, replacing operation of the vertical membrane modules 20 is carried out by pulling up the membrane modules 20 from the housing 2 in the vertical direction.

This necessitates an enough space in the vertical direction for accommodating the pulled up membrane module unit 10 and also necessitates heavy machinery for pulling up the membrane module unit 10. In contrast, with the structure in which the housing 2 can be tilted to the horizontal position as shown in FIGS. 6 to 8, the membrane module unit 10 can be pulled out in the horizontal direction, and this allows the water treating apparatus 1 using the vertical membrane modules 20 to be installed even at a place with a low ceiling and the membrane modules 20 to be easily removed. Further, when the membrane module unit 10 is pulled out from the housing 2, the membrane module unit 10 is pulled out in the horizontal direction (the direction of arrow Y). This significantly improves working efficiency when compared with conventional cases where the membrane module unit 10 is pulled up in the vertical direction using heavy machinery.

The present invention is not limited to the above described embodiment. For example, although the tiltable structure of the housing holder 3 is formed by a shaft and a bearing in the above-described example, the housing holder 3 may further include a gear or the like. For example, a gear for effecting tilting movement of the housing 2 may be provided at the bearing 3c, and the gear may meshed with another gear that is rotatably connected to a driving means such as a motor, so that the housing 2 can be tilted with being driven by the driving means.

Further, although the mechanism in which the housing holder 3 is tilted until the longitudinal direction of the housing 2 is set substantially horizontal is used in the example shown in FIGS. 6 to 8, a mechanism in which the housing 2 is tilted until an obtuse angle is formed between the longitudinal direction of the housing 2 and the vertical direction (the direction of arrow Z) may be used.

Furthermore, although the membrane module unit 10 has the four membrane modules 20 in the example shown in FIG. 2, the membrane module unit 10 may have one membrane module 20 or two or more membrane modules 20.

Moreover, although each membrane module 20 is tied at the opposite ends thereof with resin or the like in the example shown in FIG. 2, so-called U-shaped membrane modules 20 may be used as long as they can be held such that the longitudinal direction of the membrane modules is substantially vertical during filtration treatment.

Further, although the filtration treatment is carried out in the state where the longitudinal direction of the housing 2 is substantially vertical in the above described embodiment, the filtration treatment may be carried out in a state where the longitudinal direction of the housing 2 is substantially horizontal. In this case, replacement or the like may be carried out in a state where the membrane module unit 10 is pulled out in the horizontal direction or the housing 2 is set substantially vertical and pulled out in the vertical direction. For example, the housing 2 may be installed under floor with the longitudinal direction of the housing being substantially horizontal and filtration treatment may be carried out in this state. When the membrane modules 20 are to be replaced, the housing 2 may be set substantially vertical.

Figure 9:
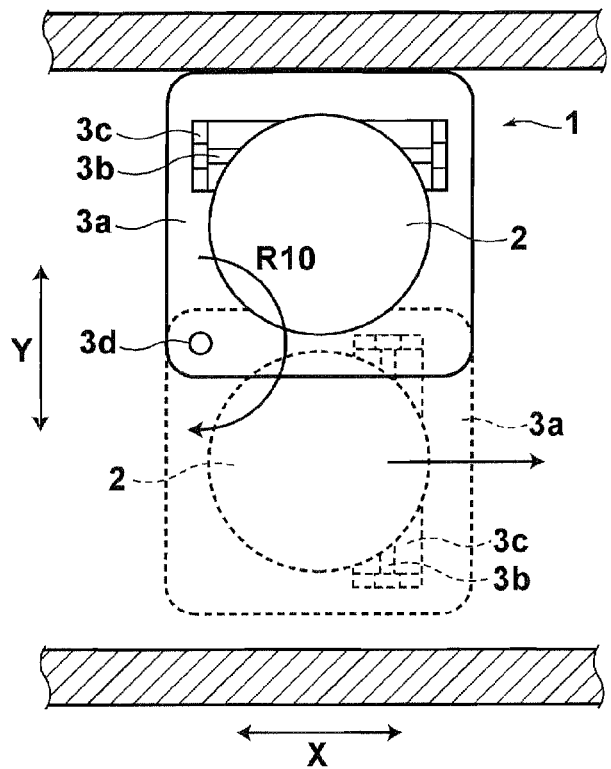
FIG. 9 is a schematic diagram showing how a base rotates.

In addition, as shown in FIG. 9, the housing holder 3 may be rotatably disposed on the floor or ground. Specifically, the base of the housing holder 3 is connected to a shaft 3d that is rotatably fixed to the floor or the like, and casters are provided on the back side of the base 3a. Thus, the base 3a is disposed to be rotatable in the direction of arrow R10 with respect to the floor or ground. When the membrane module unit 10 is pulled out from the housing 2, the base 2 is rotated in the direction of arrow R10, and then the housing 2 is tilted in the direction of arrow X (see FIG. 6). With this structure, if, for example, the water treating apparatus 1 is installed in a corridor and there is no enough space in the longitudinal direction of the tilted housing 2, in which the membrane module unit 10 is to be pulled out (the direction of arrow Y in FIG. 9), the longitudinal direction of the tilted housing 2 in which the membrane module unit 10 is pulled out can be changed via the rotating holder 3d from the direction of arrow Y in which no enough space is available, to the direction of arrow X in which enough space is available. Thus, even if there is a spatial limitation for the replacing operation not only in the vertical direction (the direction of arrow Z) but also in the direction of arrow Y or the direction of arrow X, the water treating apparatus 1 can be installed and the membrane modules 20 can be replaced or checked efficiently.

Figure 10:
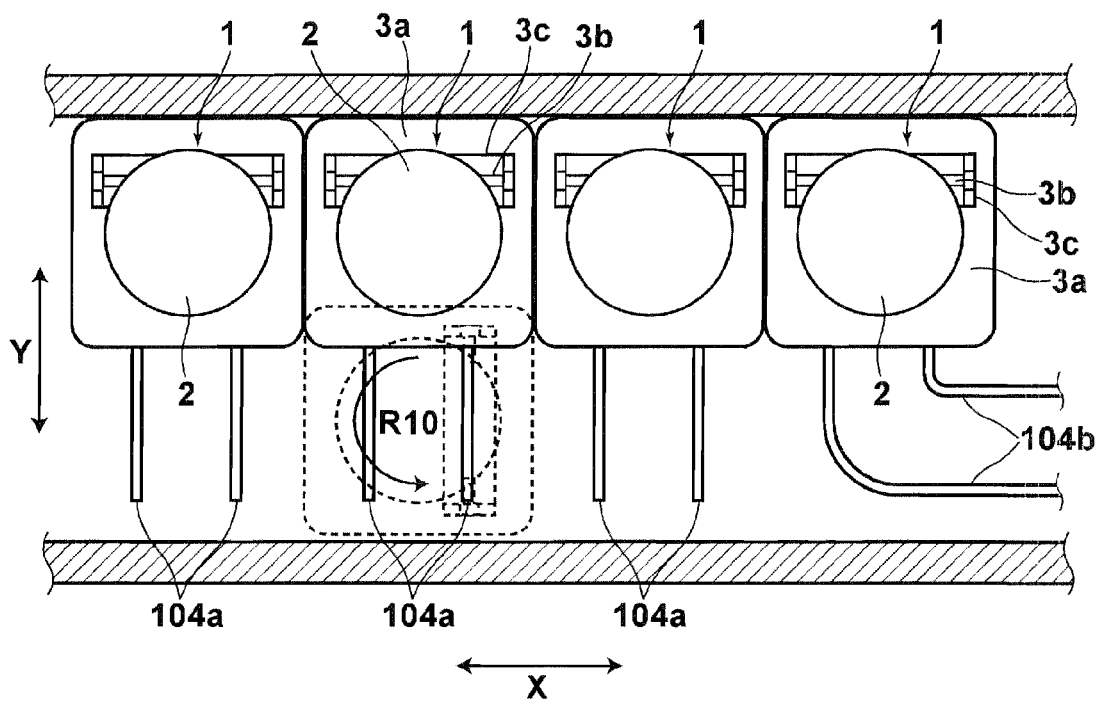
FIG. 10 is a schematic diagram showing how the base slides and rotates in a case where multiple water treating apparatuses are installed side by side.

Further, as shown in FIG. 10, in a case where the multiple water treating apparatuses 1 of FIG. 9 are installed side by side, the housing holder 3 may be disposed so as to be slidable in the horizontal direction (the direction of arrow Y) so that the housing 2 of each water treating apparatus 1 can be tilted without interfering with the other adjacent water treating apparatuses 1. Specifically, the base 3a is mounted, for example, on rails 104a so that the base 3a can slide along the rails 104a. Alternatively, the base 3a is held by a rotating holder (not shown) formed by a turntable or the like so that the base 3a can rotate with respect to the substantial center of the housing 2 in the direction of arrow R10.

When the membrane module unit 10 is pulled out from the housing 2, the base 2 is moved along the rails 104a in the direction of arrow Y, and then the rotating holder rotates in the direction of arrow R10 to allow the housing 2 to be tilted in the direction of arrow X (see FIG. 6). Thus, as described above, the direction in which the membrane module unit 10 is pulled out can be changed from the direction of arrow Y in which no enough space is available to the direction of arrow X in which enough space is available, and the housing 2 can be tilted in the direction in which enough space is available for efficiently carrying out replacement or the like of the membrane modules 20 in the case where the multiple water treating apparatuses 1 are installed side by side.

It should be noted that, although the rotating holder is used for changing the orientation of the base 3a in the example shown in FIG. 10, the base 3a may be moved along rails 104b to change the direction in which the housing 2 is tilted.

What is claimed is:

1. A water treating apparatus comprising:
a housing for receiving water to be treated fed thereto;
a membrane module unit for applying filtration treatment to the water to be treated in the housing and extracting treated water, the membrane module unit being contained in the housing such that the membrane module unit can be pulled out from the housing; and
a housing holder for holding the housing tiltably between a position where a longitudinal direction of the membrane module unit is substantially vertical and a position where the longitudinal direction of the membrane module unit is substantially horizontal,
wherein the membrane module unit comprises:
a membrane module;
a holder for holding the membrane module;
abutting members provided at the holder, the abutting members abutting on an inner wall surface of the housing and being movable on the inner wall surface,
wherein the holder comprises:
a center pipe extending along the longitudinal direction of the membrane module and positioned substantially at a center, the center pipe spraying high-pressure water on the membrane module;

a membrane module holder supported by the center pipe, the membrane module holder holding the membrane module in a position around the center pipe; and abutting member holders supported by the center pipe, the abutting member holders holding the abutting members, and wherein the abutting member holders are disposed at one end and the other end of the center pipe in the longitudinal direction, and one of the abutting member holders at the one end and one of the abutting member holders at the other end are coupled by a gas supply pipe extending in the longitudinal direction of the membrane module, the gas supply pipe blowing gas toward the membrane module.

2. The water treating apparatus as claimed in claim 1, wherein the housing holder is rotatably disposed.

3. The water treating apparatus as claimed in claim 1, wherein the housing holder is disposed slidably in a horizontal direction.

4. The water treating apparatus as claimed in claim 2, wherein the housing holder is disposed slidably in a horizontal direction.

5. A water treating apparatus comprising:

a housing for receiving water to be treated fed thereto;

a membrane module unit for applying filtration treatment to the water to be treated in the housing ad extracting treated water, the membrane module unit being contained in the housing such that the membrane module unit can be pulled out from the housing; and a housing holder for holding the housing tiltably between a position where a longitudinal direction of the membrane module unit is substantially vertical and a position where the longitudinal direction of the membrane module unit is substantially horizontal, wherein the membrane module unit comprises:

a membrane module;

a holder for holding the membrane module; and abutting members provided at the holder, the abutting members abutting on a inner wail surface of the housing and being movable on the inner wall surface, wherein the holder comprises:

a center pipe extending along the longitudinal direction of the membrane module and positioned substantially at a center;

a membrane module holder supported by the center pipe, the membrane module holder holding the membrane module in a position around the center pipe; and abutting member holders supported by the center pipe, the abutting member holders holding the abutting members, and wherein the abutting member holders are disposed at one end and the other end of the center pipe in the longitudinal direction, and one of the abutting member holders at the one end and one of the abutting member holders at the other end are coupled by a pipe extending in the longitudinal direction of the membrane module.

6. The water treating apparatus as claimed in claim 5, wherein the housing holder is rotatably disposed.

7. The water treating apparatus as claimed in claim 5, wherein the housing holder is disposed slidably in a horizontal direction.

8. The water treating apparatus as claimed in claim 6, wherein the housing holder is disposed slidably in a horizontal direction.

* * * * *